United States Patent
Tomida et al.

[19]

[11] Patent Number: 5,979,263
[45] Date of Patent: Nov. 9, 1999

[54] SHIFT LEVER DEVICE

[75] Inventors: Shigetoshi Tomida, Aichi-ken; Masaki Mizutani, Kanagawa-ken, both of Japan

[73] Assignees: Nissan Motor Co., Ltd., Kanagawa-ken, Japan; Kabushiki Kaisha Tokai-Rika-Denki-Seisakusho, Aichi-ken, Japan

[21] Appl. No.: 09/050,110

[22] Filed: Mar. 30, 1998

[30] Foreign Application Priority Data

Apr. 2, 1997 [JP] Japan .................................. 9-084082

[51] Int. Cl.⁶ .............................. B60Q 11/00; F16H 63/42
[52] U.S. Cl. ......................... 74/473.3; 74/566; 116/28.1; 340/456
[58] Field of Search .................. 74/473.3, 566; 116/28.1, DIG. 20; 340/456

[56] References Cited

U.S. PATENT DOCUMENTS 3,929,092  12/1975  Ogura ........................ 116/DIG. 20 X
4,191,064  3/1980  Houk et al. ..................... 116/28.1 X
4,503,730  3/1985  Irvin .............................. 75/566
4,991,535  2/1991  Kobayashi et al. ................ 116/28.1
5,159,892  11/1992  Hara et al. ..................... 116/28.1
5,540,180  7/1996  Kataumi et al. ................. 116/28.1

Primary Examiner—Allan D. Herrmann
Attorney, Agent, or Firm—Sixbey Friedman Leedom & Ferguson; Thomas W. Cole

[57] ABSTRACT

An opening into which a shift lever is inserted is formed on a cover slide main body. Normally, the cover slide main body moves with the shift lever. A side wall and auxiliary walls project from the opening at the rear surface side portion of the opening. The side wall blocks the opening side from the mark piece portion side. The auxiliary walls maintain rigidity of the cover slide main body around the opening. The side wall prevents light irradiated to the mark piece portion from escaping through a gap between the opening and the shift lever, and prevents water or the like from entering and splashing into the main body from outside thereof.

20 Claims, 7 Drawing Sheets

SHIFT LEVER DEVICE

BACKGROUND OF THE INVENTION

1. Field of the Invention

The present invention relates to a shift lever device for shifting a vehicle transmission.

2. Description of the Related Art

Among shift lever devices for shifting a vehicle transmission, a shift lever device which is used for an automatic transmission can select (change) a desired shift mode (range) through the control of a shift lever. Further, the shift mode selected can be viewed (confirmed) through display windows installed in the upper housing of the shift lever device.

Ordinarily, a light transmitting (transparent) plate member is mounted on the display windows. Further, a lower housing is disposed at the rear surface side of the upper housing. Moreover, a cover slide is disposed between the upper housing and the lower housing, and is thereby supported so as to move slidably. An opening into which a shift lever is inserted is formed on the cover slide. The cover slide is inserted into the opening and is moved with the shift lever by the shift lever. Further, a mark piece on which a red seal or the like is stuck is formed integrally with the cover slide. The mark piece faces the rear surface side portion of the display windows and is spaced apart from them at a predetermined distance. When the cover slide moves with the shift lever, the mark piece moves directly below the display windows in accordance with the respective shift positions. Accordingly, the mark piece stuck with the red seal or the like can be viewed from outside through the display windows. As a result, it is structured such that the shift position of the shift lever is displayed.

The mark piece of the cover slide which is viewed through the display windows must be visible even in the dark. Accordingly, it is structured such that light is irradiated by a light source such as a lamp or the like. When light is appropriately irradiated onto the mark piece in the dark, the mark piece can be reliably viewed through a display window by the light reflected from the mark piece.

In this way, such a mark piece is provided on the cover slide. As described above, the opening is formed on the cover slide, the shift lever is inserted into the opening, and the cover slide is always moved with the shift lever. However, when light is irradiated onto the mark piece, if light escapes from a gap formed between the opening and the shift lever, visibility is in fact hampered. In this case, because the gap between the opening and the shift lever cannot be helped, a method which prevents light from escaping from the gap between the opening and the shift lever is necessary.

Moreover, for example, there is a possibility that water or the like (fluids) may splash into a housing along the shift lever. In this respect, another method which prevents water or the like from splashing into the housings is necessary.

SUMMARY OF THE INVENTION

In view of the aforementioned facts, it is an object of the present invention to provide a shift lever device which can prevent light from escaping from an opening into which a shift lever is inserted and which can prevent water or the like from splashing into the opening, and which is excellent in retaining light and keeping out water.

The first aspect of the present invention is a shift lever device which is provided with a shift lever for controlling a vehicle transmission and a housing which has display windows for displaying the position of the shift lever, comprising: a cover slide which is supported on the housing so as to be slidable and in which is formed an opening into which the shift lever is inserted, and which moves with the shift lever through the control of the shift lever; a mark piece portion which is mounted on the cover slide and which faces the rear surface side portion of the display windows of the housing, and display shift positions of the shift lever; and a side wall which extends in an axial direction of the shift lever near the rear surface side portion of the opening of the cover slide so that light irradiated to the mark piece portion is prevented from escaping into the vehicle interior from the opening, and water which is prevented from entering from the vehicle interior.

In this shift lever device, the cover slide which is fixed to the housing to move slidably with the shift lever, and the mark piece portion is placed directly below display windows corresponding to each shift position. Accordingly, the mark piece portion can be viewed from an outside portion through the display windows and the selected transmission mode can be verified.

Since the side wall is fixed to extend in the axial direction of the shift lever from a rear surface side peripheral portion of the opening into which the shift lever is inserted, light irradiated to the mark piece portion is blocked by the side wall and is prevented from escaping outside through the gap between the opening and the shift lever.

For example, water or the like entering through the gap between the opening and the shift lever is blocked by the side wall and is prevented from splashing into the housing.

In this way, in accordance with the shift lever device of the present invention, it is possible to provide a shift lever device in which light loss and splash of water or the like through the opening into which the shift lever is inserted can be prevented and which is excellent in blocking light and water.

Water or the like entering through the gap formed between the opening and the shift lever can be prevented from splashing in the direction of electric lights or electrical apparatus such as solenoid of a shift lock device, which are placed downstream of the housing on the side of the display windows, if the projected height of the side wall is higher on the side of the display windows and the side wall on the side of the display windows is longer than the opening.

DESCRIPTION OF THE PREFERRED EMBODIMENTS

Figure 6:
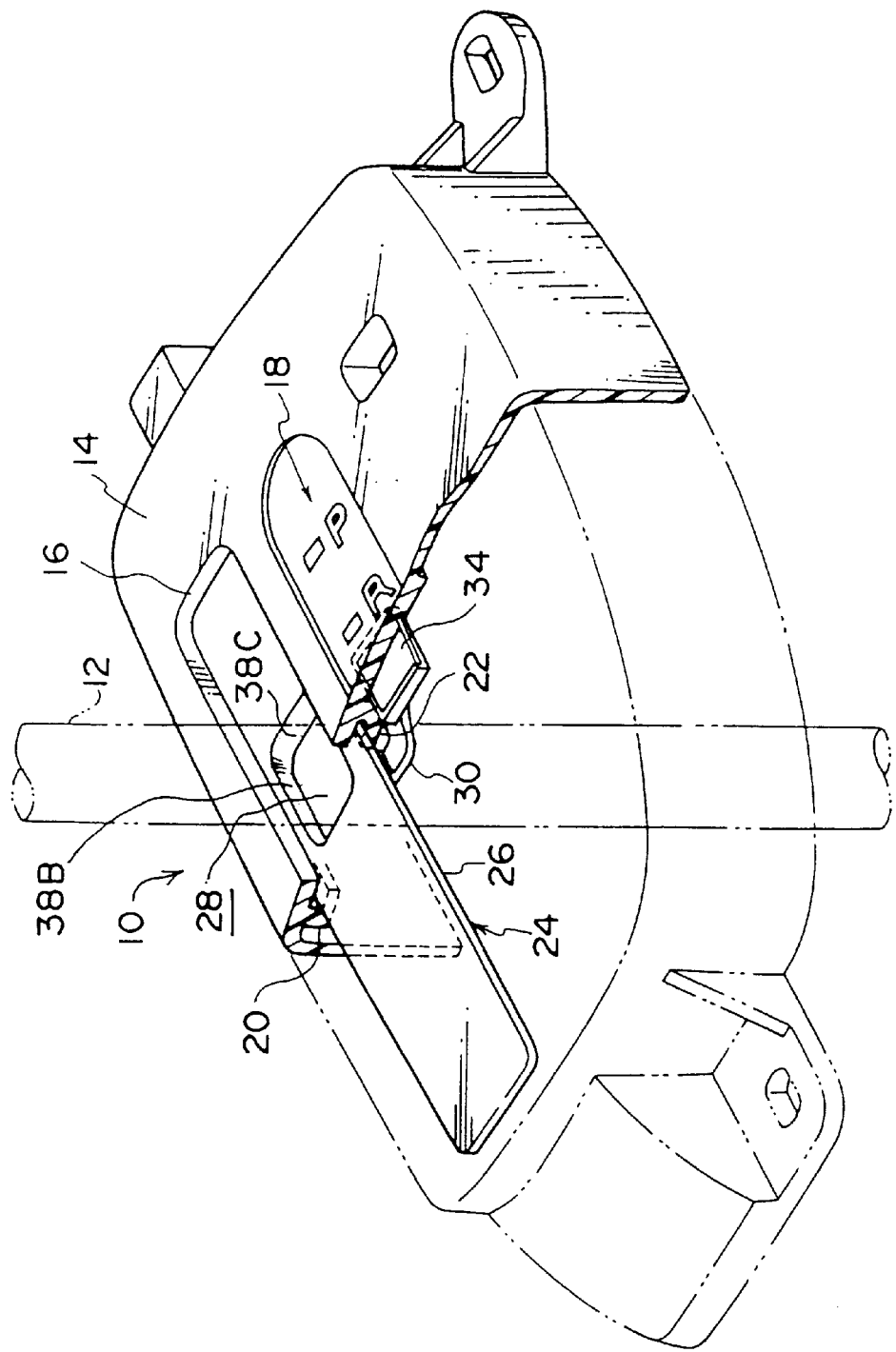
FIG. 6 is a partially broken perspective view which illustrates the overall structure of the shift lever device is applied. The present invention is applied to this cover slide.

FIG. 6 is a partially broken perspective overall structural view illustrating a shift lever device 10 which includes a cover slide 24 for a shift lever device. The present invention is applied to this cover slide 24.

The shift lever device 10 has a shift lever 12. The shift lever 12 is connected to the vehicle transmission (not shown). The transmission mode (range) can be changed by shifting/tilting the shift lever 12 back and forth.

An upper housing 14 is provided at the base end portion of the shift lever 12. The upper housing 14 is disposed in a vehicle lengthwise direction and is fixed to a plate (not shown) which is fixed to the floor of a vehicle. Further, a guide hole 16 is formed on the upper housing 14 with its length in the vehicle longitudinal direction. The shift lever 12 is inserted into the guide hole 16 and is shifted back and forth along the guide hole 16. The upper housing 14 is provided with a plurality of display windows 18 which are disposed beside the guide hole 16. Also, letters such as "P", "R", "N", "D" and the like which represent shift ranges are written beside these display windows 18. They are used for displaying shift positions and will be described later on.

A pair of guide rail portions 20 and 22, which face each other and are formed in an L shape, are provided on the rear surface portion of the upper housing 14. A cover slide 24 is positioned on the guide rail portions to move slidably.

Figure 1:
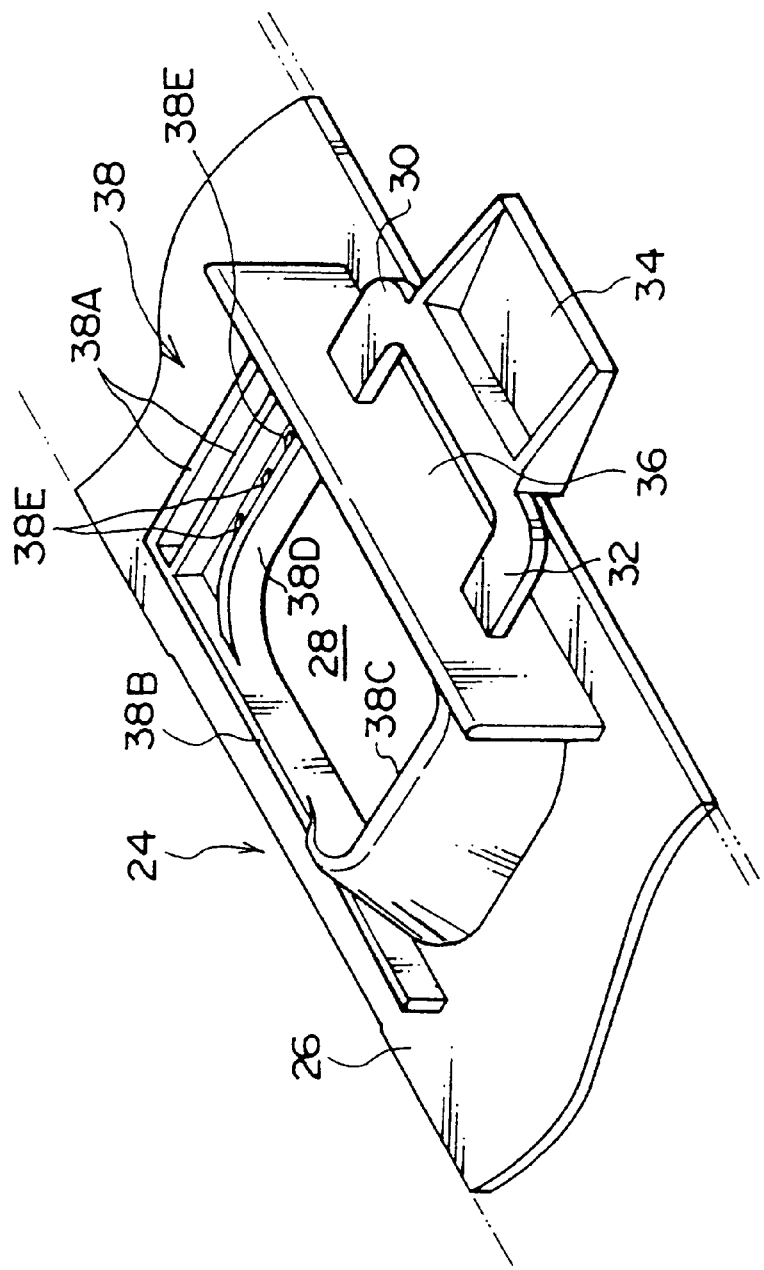
FIG. 1 is a perspective view illustrating main portions of a cover slide for a shift lever device to which the present invention is applied as seen from the rear side of the cover slide.
Figure 2:
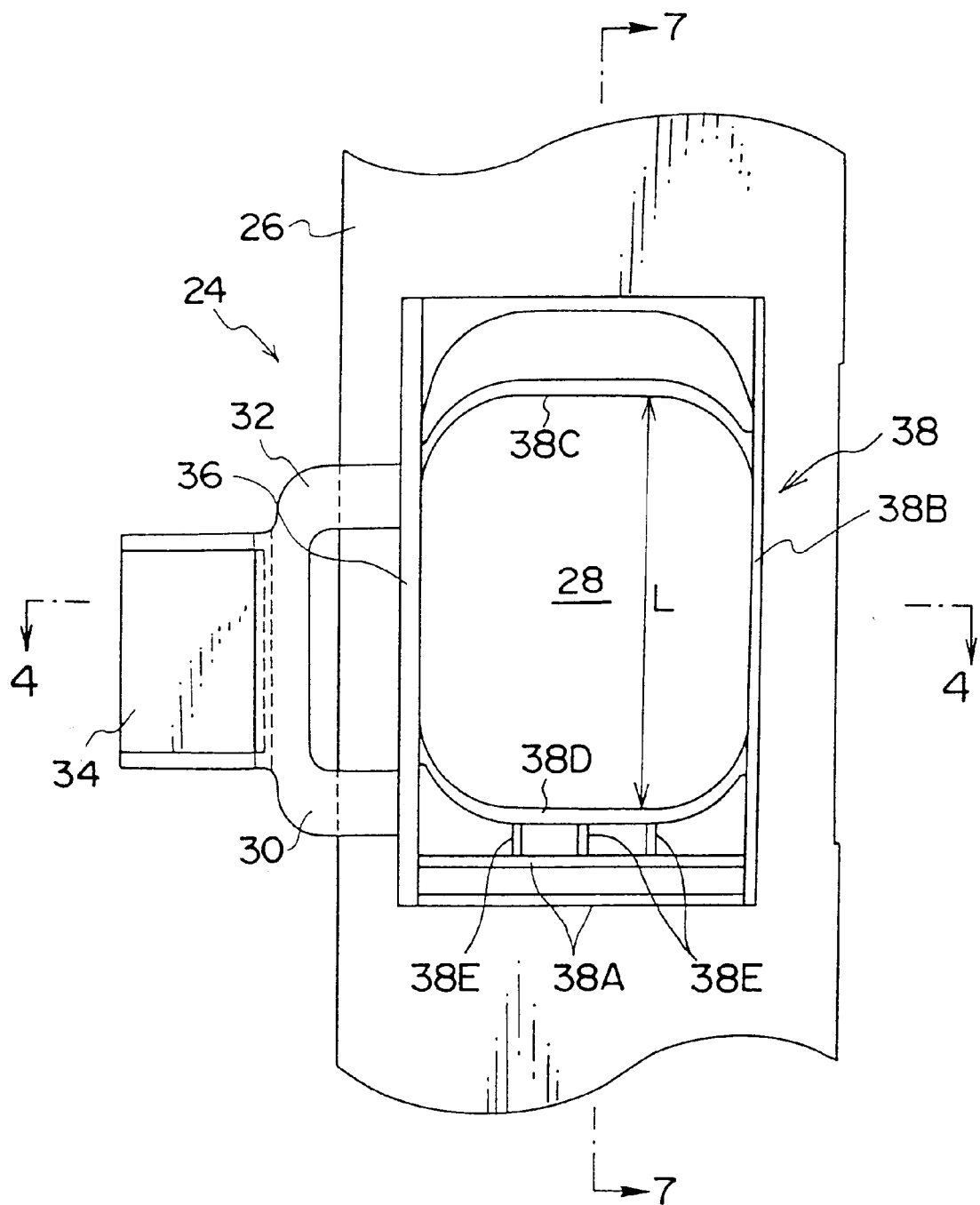
FIG. 2 is a rear side view illustrating the main portions of the cover slide for the shift lever device to which the present invention is applied.
Figure 3:
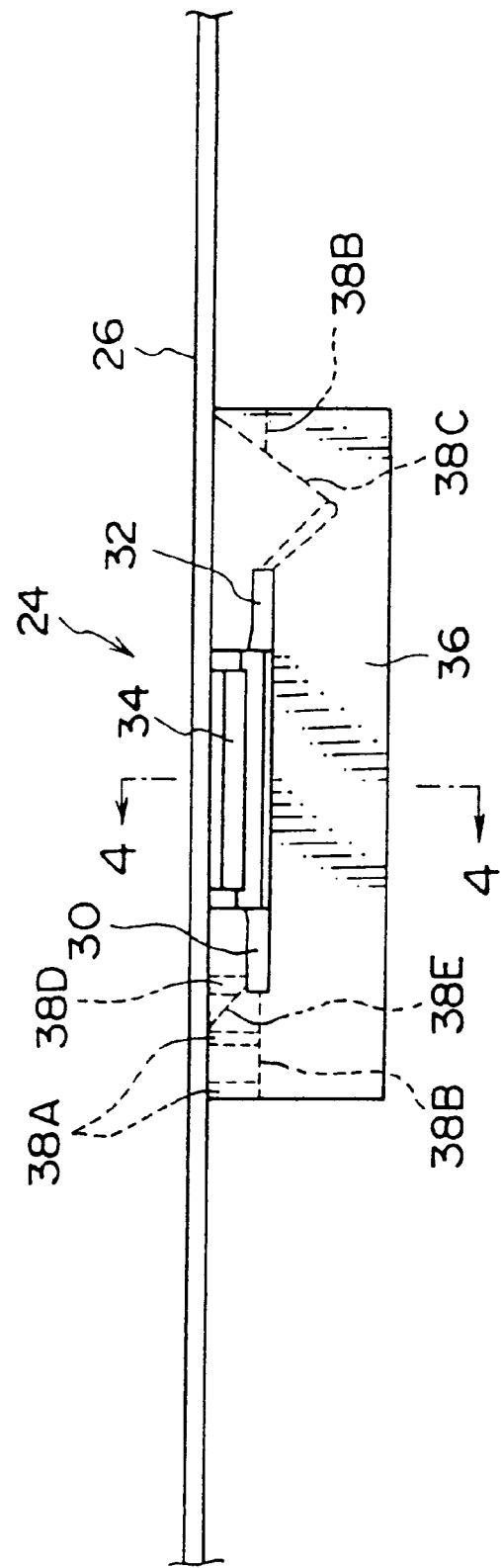
FIG. 3 is a front view illustrating the main portions of the cover slide for the shift lever device to which the present invention is applied.
Figure 4:
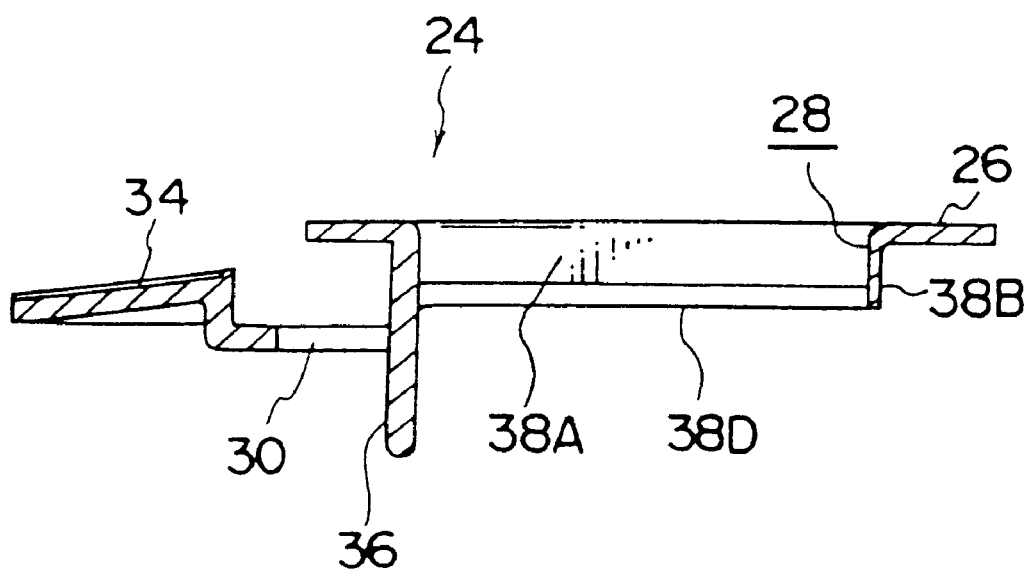
FIG. 4 is a cross-sectional view illustrating the main portions of the cover slide for the shift lever device to which the present invention is applied, taken along line 4—4 of FIG. 2 and line 4—4 of FIG. 3.
Figure 5:
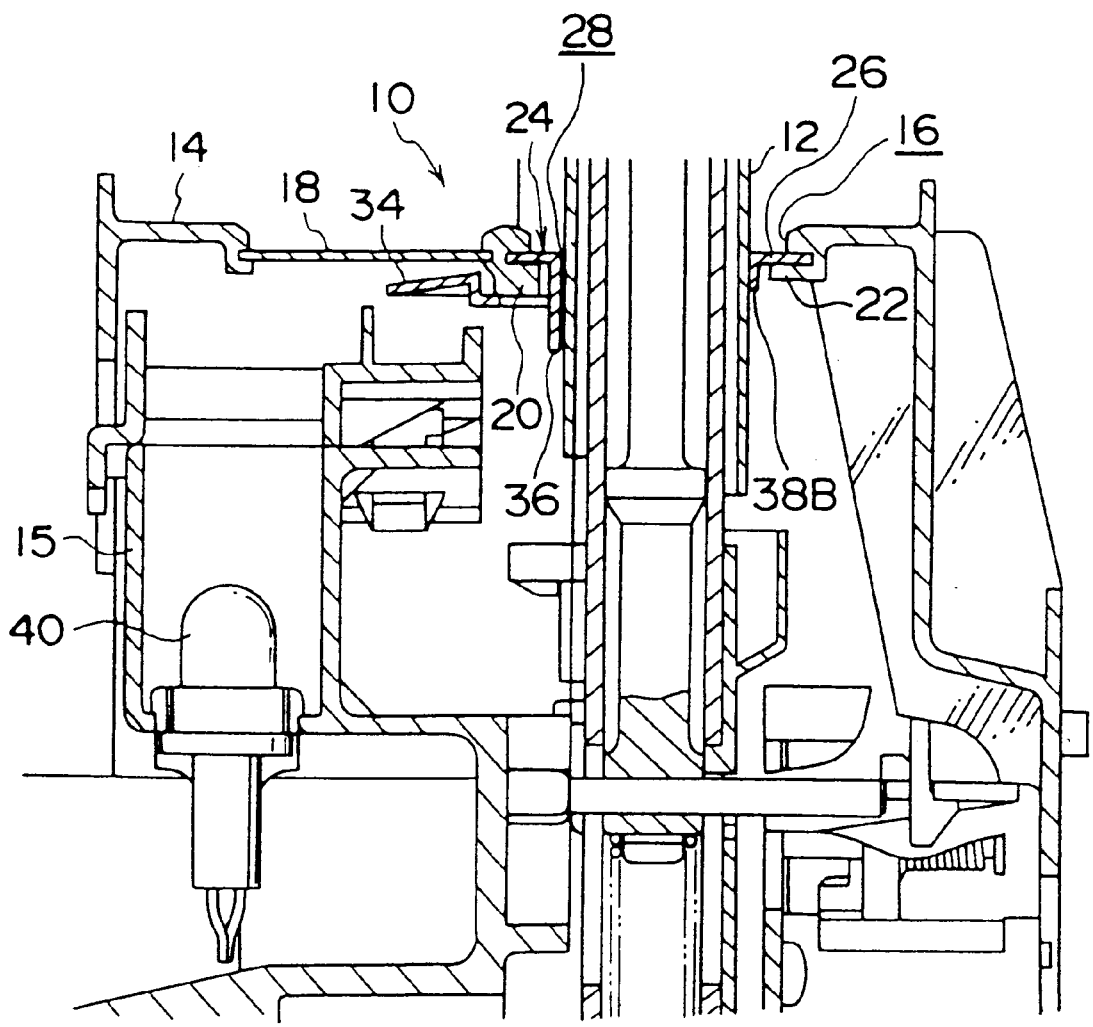
FIG. 5 is a cross-sectional view of the shift lever device illustrating the state in which the cover slide for the shift lever device to which the present invention is applied is mounted.
}

FIG. 1 illustrates a perspective view of main portions of the cover slide 24 as viewed from the rear surface side of the cover slide 24. FIG. 2 illustrates a rear surface side view of the main portions of the cover slide 24. FIG. 3 illustrates a front view of the main portions of the cover slide 24. FIG. 4 illustrates a cross-sectional view of the main portions of the cover slide 24 taken along a line 4—4 of FIG. 3 and a line 4—4 of FIG. 4. FIG. 5 is a cross-sectional view of the state in which the cover slide 24 is mounted in the shift lever device 10.

The main body 26 of the cover slide 24 is formed in an elongated rectangular plate shape. End portions of this main body 26 in a widthwise direction thereof are both supported on the guide rails 20 and 22, respectively, so that the main portion 26 of the cover slide 24 can move along the guide rails 20 and 22.

An opening 28 which corresponds to the guide hole 16 is formed in a substantially central portion of the main body 26 of the cover slide 24 in a longitudinal direction. The shift lever 12 is inserted through the opening 28, and also through the guide hole 16 of the upper housing 14. For this reason, when the shift lever 12 moves within the guide hole 16, the side wall of the opening 28 is pressed, accordingly. As a result, the cover slide 24 moves with the shift lever 12 along the guide rails 20 and 22.

A pair of leg portions 30 and 32 and a mark piece portion 34 are formed integrally with each other on the side of the opening 28 of the cover slide 24.

As shown in detail in FIG. 2, the pair of the leg portions 30 and 32 extends from the main body 26 from a widthwise directional internal position of the main body 26 (i.e., an inner side position from a portion of the main body 26 which is supported by the guide rail 20) to a widthwise directional external position of the main body with respect to a widthwise directional end portion of the main body 26 in a state in which the pair of the leg portions 30 and 32 are spaced apart from each other at a predetermined distance. The respective tip end portions of the pair of the leg portions 30 and 32 are connected (joined) to each other. Further, the mark piece portion 34 is integrally formed in continuity with the tip end curve portions of the pair of the leg portions 30 and 32. The mark piece portion 34 is formed in a thin-plated rectangular shape. As shown in FIG. 2, the mark piece portion 34 is disposed at the intermediate position of the gap which is formed between the pair of the leg portions 30 and 32 facing each other (in a longitudinal direction of the main body 26). The mark piece portion 34 is disposed on the rear surface side portion of the display windows 18 and is spaced apart from the rear surface side portion of the display windows 18 at a predetermined distance facing each other. Further, a red seal or the like is stuck on the upper surface of the mark piece portion 34. When the cover slide 24 moves with the shift lever 12, the mark piece portion 34 is positioned directly below the display window 18 which corresponds to each shift position. Accordingly, the mark piece portion 34 with a red seal or the like stuck thereon can be viewed (seen) from an outside portion through the display window 18 so that the shift position selected by the shift lever 12 can be displayed.

Figure 7:
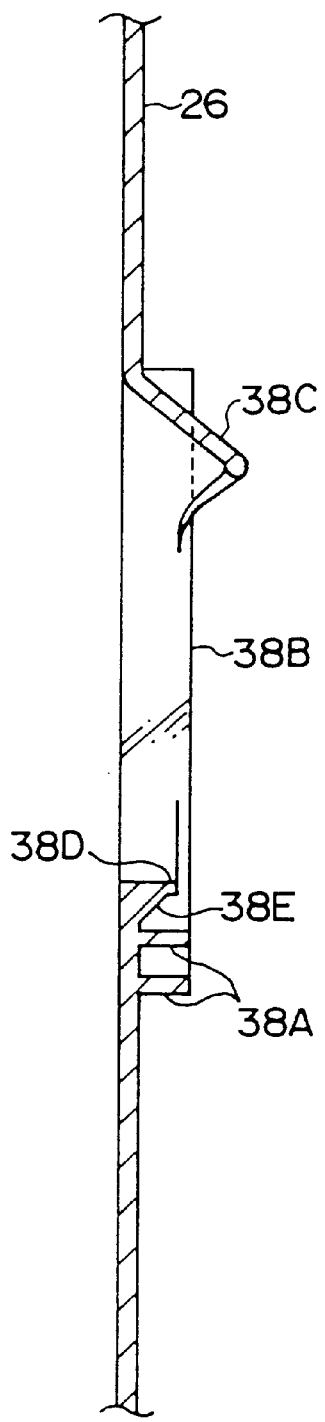
FIG. 7 is a cross-sectional view taken along line 7—7 of FIG. 2.

As shown in detail in FIG. 1, a side wall 36 and a side wall 38 serving as an auxiliary wall are provided near the rear surface side portion of the opening 28 which is formed on the main body 26 of the cover slide 24. The side wall 36 extends from the main body 26 in the direction of the axis line of the shift lever 12 and is formed in continuity with the pair of the leg portions 30 and 32 (namely, the pair of leg portions 30 and 32 which extend from the side wall 36) so as to block the opening 28 side from the mark piece portion 34 side. On the other hand, a side wall 38 comprises auxiliary walls 38A through 38D so that rigidity of the main body 26 around the opening 28 can be maintained. An auxiliary wall 38B is provided in parallel to the side wall 36. However, the auxiliary wall 38B is provided so as to oppose the side wall 36 by interposing the opening 28 therebetween. An auxiliary wall 38C and an auxiliary wall 38D are provided so as to interpose the opening 28 therebetween. Two of auxiliary walls 38A are provided in parallel to the auxiliary wall 38D. The projected height of the auxiliary wall 38D is lower than the auxiliary walls 38A and 38B. Three triangular ribs 38E are provided between the auxiliary wall 38D and the auxiliary walls 38A (see FIG. 7). The end portions of each of the auxiliary walls 38A, 38C and 38D are connected to the side wall 36 and the auxiliary wall 38B, respectively. End portions of each of the auxiliary wall 38C and the auxiliary wall 38D are formed in a circular arc shape in accordance with the corner portions of the opening 28. Accordingly, the opening 28 is formed in a substantially rectangular shape whose corner portions are formed in a circular arc shape, respectively. As shown in FIGS. 1 and 7, the auxiliary wall 38C is inclined with respect to the main body 26 and corresponds to the outer configuration of the shift lever 12 which passes through the opening 28. The projected height of the auxiliary wall 38C is higher than that of each of the auxiliary walls 38A and 38B.

The side wall 36 on the side of the display windows 18, projects higher than the side wall 38, and is longer than the length L of the opening 28.

As shown in FIG. 5, a lamp 40 is provided on the lower housing 15 of the shift lever device 10 to which the cover slide 24 having the above-described structure is mounted. By switching on the lamp 40, when necessary, light can be irradiated to the display windows 18 and the mark piece portion 34. Accordingly, when light is appropriately irradiated to the mark piece portion 34 in the dark, the mark piece portion 34 can be reliably viewed by light reflected from the mark piece 34 through the display windows 18.

Although it is not shown, other than the aforementioned lamp 40, electric equipment such as solenoid or the like for a shift lock device (a key interlock device) is disposed below and principally along the length of the upper housing 14 provided on the side of the display windows 18.

Operation of the present embodiment having the above-described structure will be explained hereinafter.

In the shift lever device 10 which is structured as described above, when the shift lever 12 is shifted in order to select (change) a transmission mode (range), the cover slide 24 moves with the shift lever 12 along the guide rails 20 and 22, and the mark piece portion 34 is positioned directly below the display windows 18 corresponding to each shift position. Accordingly, the mark piece portion 34 (which is stuck with a red seal) is viewed from outside through the corresponding display window 18 so that the selected transmission mode can be recognized.

In the night time or the like, light is irradiated onto the mark piece portion 34 by switching on the lamp 40. The light reflected from the mark piece portion 34 allows the mark piece portion 34 to be reliably viewed through the display windows 18.

In the cover slide 24, the side wall 36, which extends axially along the shift lever 12 and blocks the opening 28 side from the mark piece portion 34 side, is provided near the rear surface side portion of the opening 28 into which the shift lever is inserted. Accordingly, light irradiated from the lamp 40 is blocked by the side wall 36 so that light is prevented from escaping out into the vehicle, for example, through the gap formed between the opening 28 and the shift lever 12.

For example, even if water or the like (fluids) passes through the gap between the opening 28 and the shift lever 12, it is blocked by the side wall 36 and the side wall 38, and prevented from splashing into the upper housing 14.

Since the side wall 36 on the side of the display windows 18 is higher than the side wall 38, and is longer than the length L of the opening 28, water or the like is prevented from splashing into the lamp 40 or electric apparatus such as a solenoid and the like for a shift lock device (a key interlock device) which is not shown, which are disposed at the lengthwise directional lower portion of the upper housing 14.

In this way, the cover slide 24 for the shift lever device can prevent the escape of light and splash of water or the like from the opening 28 into which the shift lever 12 is inserted. It is excellent at preventing loss of light and in preventing water or the like from entering. Further, in the cover slide 24, the side wall 38 is provided near the rear surface side portion of the opening 28 in order to maintain rigidity of the main body 26 in the vicinity of the opening 28. Accordingly, when the cover slide 24 moves with the shift lever 12, the cover slide 24 does not bend or flex unnecessarily. It is possible to move the cover slide 24 smoothly and effectively.

What is claimed is:

1. A shift lever device which is provided with a shift lever for controlling a vehicle transmission and a housing which has display windows for displaying the position of said shift lever, comprising:

(a) a cover slide which is supported on guide rails formed at out portions of said housing so as to be slidable and in which is formed an opening into which said shift lever is inserted, and which moves with said shift lever through the control of said shift lever;

(b) a mark piece portion which is mounted on an underside of said cover slide and which faces the rear surface side portion of the display windows of said housing, and display shift positions of said shift lever; and (c) a side wall mounted on said underside of said cover slide between said mark piece portion and said cover slide opening and extending in an axial direction on the shift lever for preventing light irradiated to said mark piece portion from escaping into the vehicle interior from said opening, and for preventing water spilled onto said cover slide from splashing into the housing of the shift lever device.

2. A shift lever device according to claim 1, wherein said mark piece portion projects from said side wall so that said mark piece portion is supported on said cover slide through said side wall.

3. A shift lever device according to claim 2, wherein a portion at which said mark piece portion is mounted to said cover slide is bifurcated.

4. A shift lever device according to claim 1, wherein said side wall is longer than said opening along a direction in which said shift lever moves.

5. A shift lever device according to claim 1, further comprising auxiliary walls which enclose said opening together with said side wall so as to reinforce said cover slide.

6. A shift lever device according to claim 5, wherein said side wall and said auxiliary walls project from the surrounding rear surface side portion of said opening in the form of ribs.

7. A shift lever device according to claim 5, wherein said side wall projecting from said cover slide is higher than said auxiliary walls.

8. A shift lever device according to claim 5, wherein said side wall and one of said auxiliary walls are longer than said opening along a direction in which said shift lever moves.

9. A shift lever device according to claim 1, wherein said cover slide has a plate shaped main body on which said opening is formed and said side wall is vertically projected from the main body.

10. A shift lever device according to claim 9, wherein mark piece portion projects from said side wall.

11. A shift lever device according to claim 5, wherein said auxiliary walls project from a periphery of said opening where said side wall is not provided so that said side wall and said auxiliary walls surround the periphery of said opening.

12. A shift lever device according to claim 11, wherein the projected height of said side wall is higher than that of said auxiliary walls.

13. A shift lever device according to claim 12, wherein said side wall is longer than said opening along a direction in which the shift lever moves.

14. A shift lever device, comprising:

(a) a shift lever which controls a vehicle transmission;

(b) a housing into which the base portion of said shift lever is incorporated and at which display windows for displaying shift lever positions are provided;

(c) a cover slide main body which is supported on guide rails formed at outer portions of said housing so as to move slidably, on which is formed an opening into which said shift lever is inserted, and which moves with the shift lever through the control of said shift lever;

(d) a mark piece portion which is supported on an underside of said cover slide main body and which faces a rear surface of said display windows of said housing for displaying respective shift positions of said shift lever; and (e) a side wall mounted on said underside of said cover slide main body between said mark piece portion and said cover slide opening and which extends in an axial direction of said shift lever for preventing light irradiated to said mark piece portion from escaping through said opening, and preventing water spilled onto said cover slide main body from splashing into said opening, wherein said side wall has an axial length slightly larger than an axial length of said opening.

15. A shift lever device according to claim 14, wherein, in addition to said side wall, auxiliary walls are provided around the periphery of said opening so as to surround said opening, projecting from the rear surface peripheral portion of said opening so as to form a rib shape.

16. A shift lever device according to claim 15, wherein the projected height of said side wall is higher than that of said auxiliary walls, said mark piece portion projecting from said side wall.

17. A shift lever device according to claim 16, wherein said side wall is longer than said opening in the direction in which the shift lever moves.

18. A shift lever device according to claim 14, wherein said side wall is longer than said opening in the direction in which the shift lever moves.

19. A shift lever device according to claim 14, wherein said opening is formed in a substantially rectangular shape, said side wall which projects from a side of the opening is higher than auxiliary walls which project from the other three sides, and said mark piece portion is supported on said side wall.

20. A shift lever device, comprising:

(a) a shift lever which controls a vehicle transmission;

(b) a housing into which the base portion of said shift lever is incorporated and in which display windows for displaying shift lever positions are provided;

(c) a cover slide main body which is formed in a plate shape and is supported on said housing so as to be slidable, and on which is formed an opening into which said shift lever is inserted, and which moves with the shift lever through the control of said shift lever;

(d) a mark piece portion which is supported on said cover slide main body, and faces the rear surface side portion of said display windows of said housing, for displaying shift positions of said shift lever;

(e) a side wall which is a rear surface of said opening on which side said mark piece portion is disposed, said side wall projecting vertically from the vicinity of said opening; and (f) auxiliary walls which project from the rear surface side peripheral portion of said opening, each projected height being lower than that of said side wall so that said auxiliary walls and said side wall can surround the entire periphery of said opening, and can prevent light from escaping from said opening and prevent water from entering through said opening.

* * * * *